(No Model.)

W. FRIEND.
LUBRICANT LINING FOR FRICTION BEARINGS.

No. 445,989. Patented Feb. 10, 1891.

Attest:
C. W. Benjamin
H. T. Fales.

Inventor:
William Friend
By Arden I. Fitch
atty.

UNITED STATES PATENT OFFICE.

WILLIAM FRIEND, OF NEW YORK, N. Y.

LUBRICANT LINING FOR FRICTION-BEARINGS.

SPECIFICATION forming part of Letters Patent No. 445,989, dated February 10, 1891.

Application filed May 9, 1890. Serial No. 351,162. (No model.)

*To all whom it may concern:*

Be it known that I, WILLIAM FRIEND, of the city, county, and State of New York, a citizen of the United States, have invented certain new and useful Improvements in Lubricant Linings or Surfaces for Friction-Bearings, of which the following is a full, clear, and exact description, reference being had to the accompanying drawings, forming part of this specification.

My invention relates to that class of lubricant surfaces for journal and other friction bearings, consisting in a solid lubricant composed of plumbago, graphite, and resinous substances—such, for example, as shellac or other animal, vegetable, and mineral substances possessing lubricant qualities — as mixed ingredients, and which lubricant is employed as a compacted solid mass fixed in or upon a rigid base or support in the bearing.

My invention consists in a base, support, or plate of desiccated wood, the pores or interstices of the fiber of which are filled with lime in a finely-powdered state, and a solid lubricant material fixedly secured in or upon a face of said wooden plate, substantially as and for the purposes hereinafter set forth.

Figure 1:
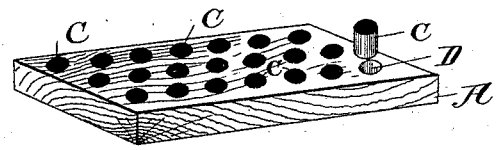
Figure 2:
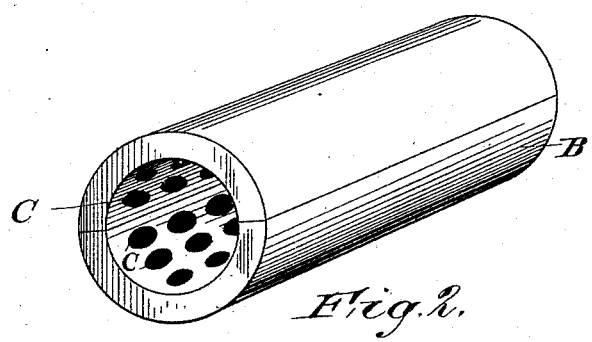

Figure 1 is a plan in perspective of a flat or plane face lubricant lining or surface constructed according to my invention, and Fig. 2 is a modification of the same in the form of a bushing.

In constructing my improved lubricant lining I take a suitable plate or block of wood and desiccate the same by eliminating or expelling from it the natural juices and moisture, which may be accomplished by any of the well-known processes for this purpose—as, for example, by subjecting the wood to the action of steam in confinement, whereby the wood is saturated and the albuminous elements of the sap are coagulated, so that when the wood is thereafter dried the pores or interstices of its fiber will be free and open. The wood after steaming may be dried in a suitable kiln. I then fill the pores and interstices of the wood fiber with lime in a finely-powdered state, and this may be accomplished by subjecting the wood to a bath under pressure composed of the lime in suspension in water. The lime held thickly in suspension in the water will, by the air-pressure exerted on the bath, be forced into the open pores or interstices of the wood. The wood may then be finally dried in a suitable kiln. The wood thus desiccated and filled with lime may be in the form of plane-faced plates, as shown at A in Fig. 1, or it may be in the form of cylinders or bushings, as shown at B in Fig. 2.

In completing the described lubricant lining I fixedly secure a solid lubricant material of the character and composed of any of the well-known ingredients hereinbefore named in or upon that face of the wood plate which is to constitute the friction-surface for the bearing. This may be accomplished in the usual manner employed to fix a solid lubricant to a rigid base, as by seating compacted and compressed plugs C of the solid lubricant in corresponding recesses D, formed in the face of the wood, as illustrated in the drawings.

The described lining is not only economical in cost, but it possesses great effectiveness and durability as a lubricant, the presence of the lime in the wood fiber giving to the wood increased solidity and firmness and imparting to the wood itself a quality of lubrication which in connection with the solid lubricant fixed in or upon its friction-surface, produces a lubricant surface of a most desirable character.

What I claim as my invention, and desire to secure by Letters Patent, is—

As a lubricant lining or surface for friction-bearings, the combination of a desiccated wood plate or block, the pores or interstices of the fibers of which are filled with lime in a finely-powdered state, with solid lubricant material fixedly secured in or upon a face of said plate or block, substantially as and for the purpose set forth.

WILLIAM FRIEND.

Witnesses:
A. S. FITCH,
A. T. FALES.